Figure 1:
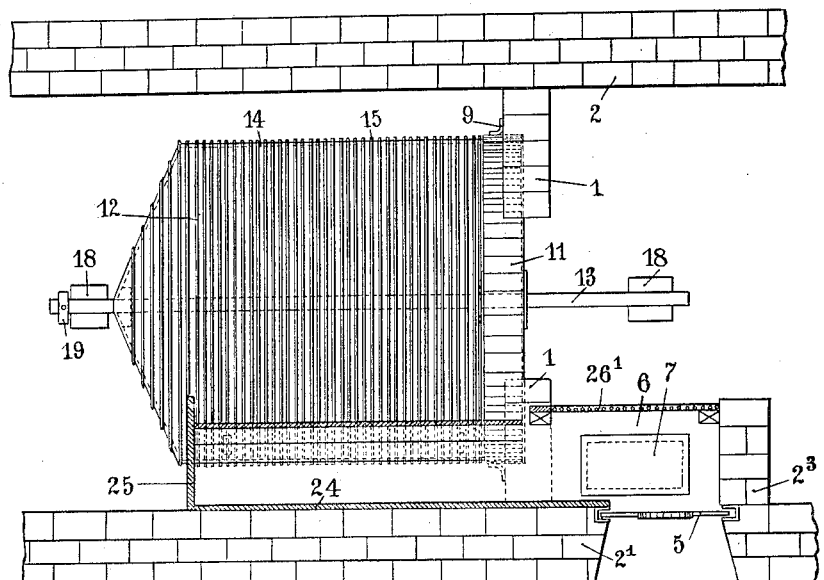

E. A. L. GUIU.
AUTOMATIC APPARATUS FOR REMOVING LEAVES, REFUSE, OR LARGE PARTICLES CARRIED ALONG BY WATER, &c.
APPLICATION FILED OCT. 24, 1912.

1,092,440.

Patented Apr. 7, 1914.

4 SHEETS—SHEET 1.

WITNESSES
Frank Hogan
Alfred R. Anderson

INVENTOR
E.A.L. Guiu
BY Hran Dedennel
ATTORNEY

E. A. L. GUIU.
AUTOMATIC APPARATUS FOR REMOVING LEAVES, REFUSE, OR LARGE PARTICLES CARRIED ALONG BY WATER, &c.
APPLICATION FILED OCT. 24, 1912.

1,092,440.

Patented Apr. 7, 1914.
4 SHEETS—SHEET 2.

WITNESSES
Frank H Logan
Alfred P Anderson

INVENTOR
E.A.L. Guiu
BY
ATTORNEY

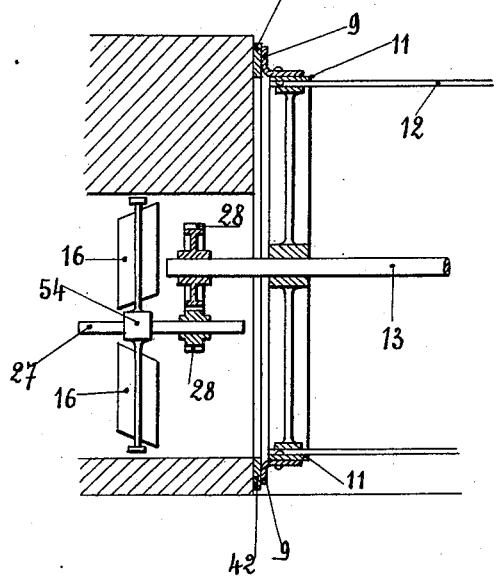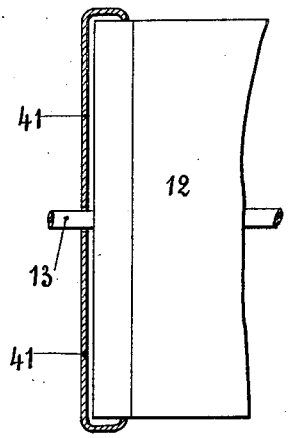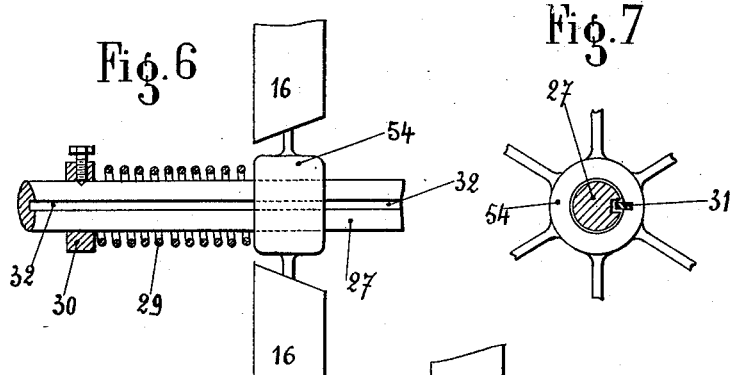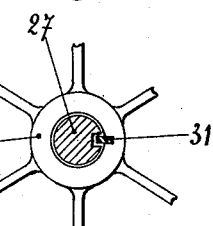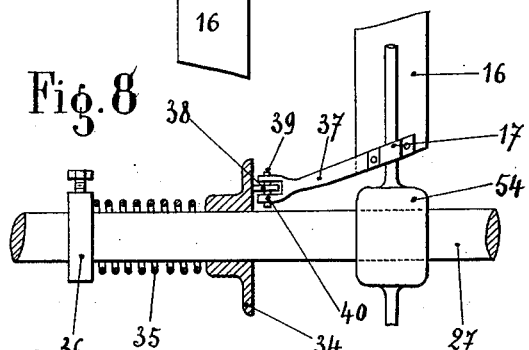

E. A. L. GUIU.
AUTOMATIC APPARATUS FOR REMOVING LEAVES, REFUSE, OR LARGE PARTICLES CARRIED ALONG BY WATER, &c.
APPLICATION FILED OCT. 24, 1912.
1,092,440.
Patented Apr. 7, 1914.
4 SHEETS—SHEET 4.
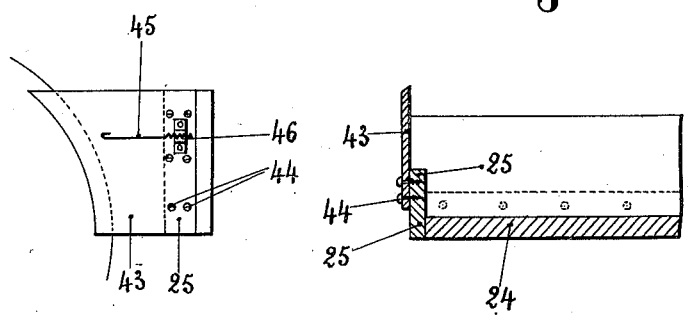
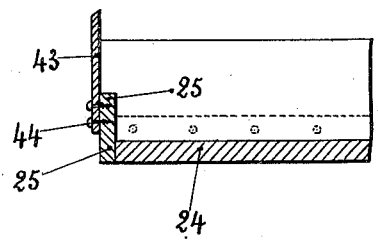
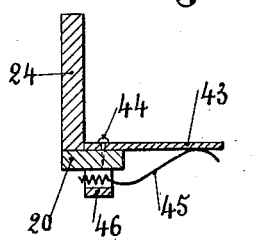
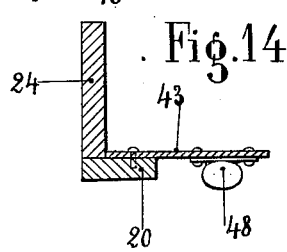
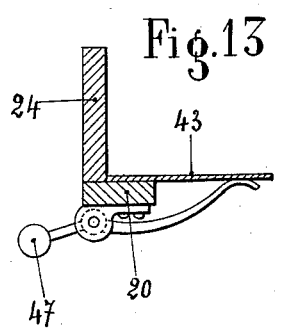
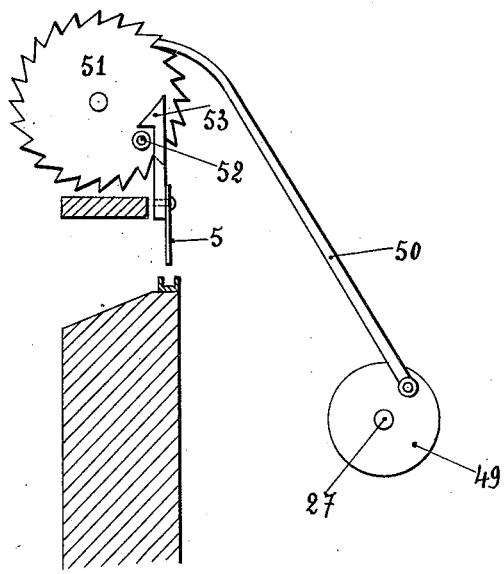
WITNESSES
B.P. Appleton
Alfred R. Anderson
INVENTOR
E.A.L. GUIU
BY H. Van Dedemuel
ATTORNEY
COLUMBIA PLANOGRAPH CO., WASHINGTON, D.C.

UNITED STATES PATENT OFFICE.

ERNEST ALPHONSE LAURENT GUIU, OF PRATS-DE-MOLLO, FRANCE.

AUTOMATIC APPARATUS FOR REMOVING LEAVES, REFUSE, OR LARGE PARTICLES CARRIED ALONG BY WATER, &c.

1,092,440.　　　　　　Specification of Letters Patent.　　Patented Apr. 7, 1914.

Application filed October 24, 1912. Serial No. 727,559.

*To all whom it may concern:*

Be it known that I, ERNEST ALPHONSE LAURENT GUIU, a citizen of the French Republic, residing at Prats-de-Mollo, Pyrénées-Orientales, France, have invented certain new and useful Improvements in Automatic Apparatus for Removing Leaves, Refuse, or Large Particles Carried Along by Water or All Flowing Fluids, of which the following is a full, clear, and exact description.

This invention has reference to an apparatus provided with filtering walls, of suitable shape, dimensions and nature and one of which at least is movable for effecting the automatic elimination and removal of leaves, refuse and solid particles carried along by water or all flowing fluids without the employment of rakes, brushes or the like. This result is attained by an arrangement of parts certain of which not only serve to cause the foreign bodies to pass toward the exterior, but act up definitely directed currents in the fluid itself; these currents circulating against or through the walls which they encounter, thereby separating, collecting and removing the foreign bodies through permanently opened outlets or outlets opened intermittently, which outlets may be opened automatically or not.

The following are the essential features characterizing this invention:—No mechanical part is necessary or even required for removing the bodies held back by the filtering walls. The surface of the filtering walls holding back these bodies never comes into contact with any liquid that has already been separated from the said bodies. The separation and evacuation of the bodies is effected solely from currents derived from the kinetic energy of the flowing fluid, directly acting on the bodies to be eliminated, that is to say, without the intervention of any rake or brushes operated by it. The necessary movement for displacing the filtering wall or walls as well as the manipulation of the sluices or stoppers closing the orifices may be obtained either from motor parts independent of the apparatus although also driven by the liquid, or from some outside source of energy. The bodies to be eliminated are carried along by the current in which they float and adhere to a filtering wall which conducts them to a spot where a current coming from the same fluid but passing through the said wall in an opposite direction detaches them from it, for the purpose of conducting them either directly to the outside or to a decanting chamber from which they are subsequently removed.

By way of example an installation with a rotary, conical, cylindrical grid or screen arranged in the water channel of a factory for the purpose of eliminating leaves and small floating bodies carried along by the water, is illustrated in the accompanying drawing in which:—

Figure 3:
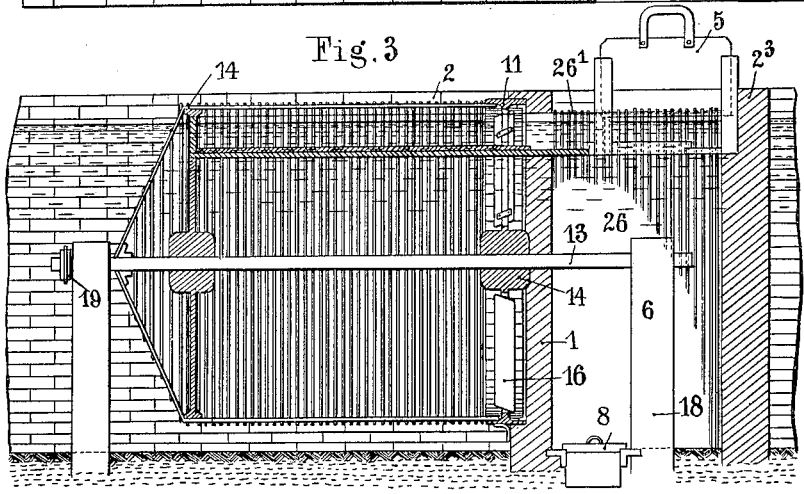
Figure 2:
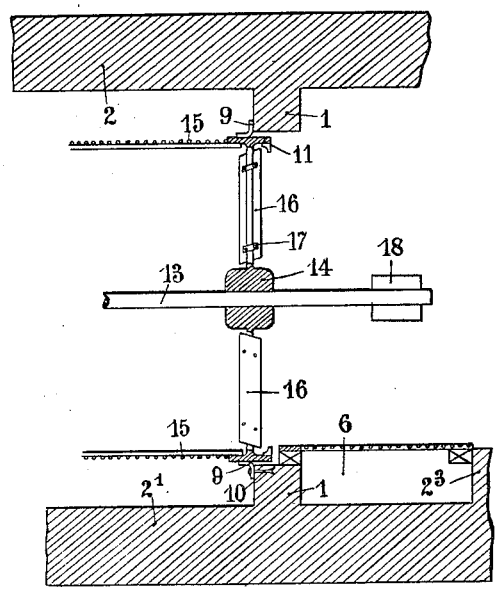
Figure 4:
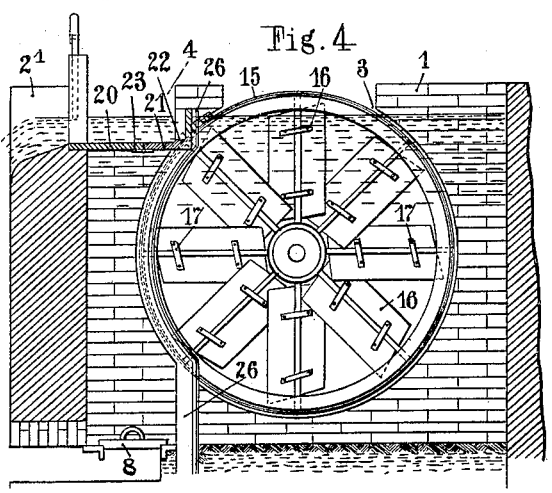

Figure 1 is a plan view of the complete filter. Fig. 2 is a section thereof on a horizontal diameter. Fig. 3 is an elevation on the right-hand side, showing some of the parts in front view and some in section; the small wall on the right being removed to show the apparatus and the wall on the left. Fig. 4 is an elevation of the back portion of the filter. Fig. 5 is a central vertical section showing the propeller shaft eccentric to the main shaft; Fig. 6 is a fragmental side elevation, partly in section, showing the device permitting horizontal movement of the propeller; Fig. 7 is an end elevation, partly in section, of the same; Fig. 8 is a side elevation, partly in section, showing the yielding device for permitting the shifting of the propeller blades; Fig. 9 is a central vertical sectional view showing the jointing of the cover sieve; Fig. 10 is an end elevation of the trough; Fig. 11 is a vertical sectional view of the same; Figs. 12 to 14 are transverse sections of various forms of troughs; Fig. 15 is an elevation of mechanism for controlling the gate to the decanting chamber.

A watertight partition or barrage 1 of masonry or any other material connects perpendicularly the walls 2 and 2′ of the channel and is provided with a large circular opening 3, through which the filtered water passes from the upper to the lower reaches of the stream, and also with a small rectangular opening 4. This latter opening is the only one for the passage of the leaves to the sluice 5 or the decanting reservoir 6 through the opening provided with the plug 7. This decanting reservoir communicates for its part with the exterior through the opening provided with the plug 8. The barrage 1 furthermore serves as a support for an elastic or nearly flexible band 9 (of leather or any other suitable material) which is fastened by means of bolts 10 around the circular opening 3. The band is in the form of a right-angle, in cross section and embraces the solid and smooth circle 11 of the rotary grid 12.

The grid 12 consists of a shaft 13 mounted in a rigid fitting 14 furnished with bars or the like forming a suitable filtering wall 15, and with a suitable number of blades 16 which are held at a definite angle by straps 17. When necessary an arrangement permits of regulating even during the working of the apparatus the inclination of these blades for the purposes hereinafter set forth.

Two standards 18 support the whole of the rotary grid, so that its shaft passes through the center of the circular opening 3, the solid surface 11 of the drum only slightly engaging in the said opening. One or more collars 19 pinned to the shaft prevent the lateral displacement of the grid, which turns freely in the supports 18, the flexible band 9 only exerting a very slight pressure on it. The circular opening 3 is thus entirely covered over by the base of the rotary grid, which causes the water flowing from the upper portion of the stream to pass through the filtering wall 15. The water in its passage to the other side of the barrage acts on the screw formed by the blades 16 and rotates the grid.

The rectangular opening 4 gives access to a kind of trough one end of which is formed by a wall $2^3$, while the floor 20 is provided with a plank 21 having a very low border 22, cut at a bevel close to the wall 15 of the grid. The plank 21 can turn downward on hinges 23. Along one side of the trough is a wall 24 terminating in an end wall 25 which embraces the curve of the wall 15. Behind the barrage is a grid 26 held by the fitting $26^1$ which being continued down to the ground timberwork of the channel serves as a wall for the decanting chamber 6 which for its part is completed by the back of the barrage 1 and the walls $2^1$ and $2^3$, so far as the latter are situated below the trough.

The filtering wall 15 in its rotary movement touches the edges, already described, of the trough, so that the latter is practically cut off from the water flowing from the upper portion of the stream and is in permanent communication on the one hand through the filtering wall 15 with the water which fills the rotary grid and on the other hand with the water of the lower portion of the stream through the grid 26. Furthermore the trough is in direct communication with the outside when the sluice 5 is raised or only with the decanting chamber 6 when the sluice 5 is closed and the stopper 7 raised. Finally, an arrangement connects, when required, the continuously rotated shaft 3 either to the sluice 5 or to the plug 8 by suitable mechanical parts which determine their being raised up at more or less regular spaced intervals according to the quantity of leaves or refuse to be eliminated.

When working the water flows into the channel and rises to a height slightly less than that of the edges of the trough, it therefore acts, as has been stated, on the blades 16 after having passed through the filtering wall 15 from outside to inside. As soon as the grid 12 charged with leaves which were held in suspension in the water which has just passed through the grid, begins to rotate around its axle in a direction determined by the position of the blades, the leaves carried along and raised above the water by the side opposite the trough are brought into contact with the surface of the liquid flowing in the latter. At this moment the leaves are acted on by a current passing through the filtering wall 15 from the inside of the rotary grid toward the outside, that is to say, toward the trough, this current being occasioned by the water that has entered the rotary grid slightly flowing back owing to the obstacles offered by the blades 16 to its normal discharge. Its level is consequently higher than that of the water which flows into the trough, because the latter not encountering any obstacle keeps practically at the level of the water of the lower portion of the stream. Under the action of this current the leaves are detached from the filtering wall 15, follow the current of water in the trough and thus collected are carried along, when there is no lack of water, simply to the exterior through the permanently or intermittently opened sluice 5 or on the contrary into the decanting chamber 6, from where they pass through the opening of the plug 8 at greater or less intervals. As has been stated above the opening of these sluices or plugs can be effected automatically by means of parts driven either by the shaft 3 or by a motor actuated by the water or by a separate source of energy. It is thus that the triple difference in level each occasioning a current between the waters of the upper portion, those flowing into the interior of the rotary grid and those of the trough constitutes the sole and sufficient motive power for separating out and discharging the leaves.

The arrangement provided for regulating even during the working of the apparatus the inclination of the blades 16 is for the purpose of proportioning the section of the openings comprised between these blades to the quantity of water flowing in the channels. Too large a section would not permit the existence of sufficient difference in level between the waters of the upper and the lower portion: too small a section would disadvantageously affect the efficiency of the apparatus.

The pivoting of the plank 21 around the hinges 23 is for the purpose of permitting the free passage of too large bodies engaging between the trough and the grid 12. The pressure of the water on its under surface and the density of the plank 21 being less than that of the water keeps this plank horizontal during the normal working of the apparatus.

The propeller composed of the blades 16 is preferably mounted on a shaft 27 independent of that of the grating 12 (Fig. 5). This propeller thus constitutes a motor independent of the sieve or grating which is operated by means of reducing gears. This device permits of reducing the circumferential speed of the grating 12 which increases its rotary force.

In order that the propeller may be mounted on the shaft 13 of the grating 12 or on an independent shaft 27, as has just been explained, it is desirable in order to render the device capable of operating in spite of the greatest variations in the volume of water which it receives, to give to the propeller the power to be displaced down stream, by sliding along its shaft, without ceasing to carry it along in its rotary movement. For this purpose (Figs. 6 and 7), the propeller is held at repose in its normal position within the circular opening 3 by means of a spiral spring 29, fastened on the shaft 27 and which bears, on the one hand, on the nave 54 of the propeller and, on the other hand, on an adjusting ring 30. The shaft is moved by the propeller by means of a key 31 fixed to the nave 54 of this propeller and sliding in a groove 32 provided along the shaft 27. The grating 12 is rotated as soon as there is a sufficient current; thus in proportion as this current becomes stronger, the propeller compresses the spring 29 thus producing an annular space between its periphery and the lower wall of the barrier 1, which space furnishes a passage for the whole volume of water exceeding the normal delivery of the propeller. As said above, the inclination of the blades 16 can also be made adjustable. This device is shown in Fig. 8. In this case the nave 54 of the propeller is fixed to its shaft 27 and the blades 16, held by the collars 17, can turn about their axes or supports 33. A plate 34, sliding upon the shaft 27 and subjected to the action of a spring 35 resting against a regulating ring 36, holds the blades 16 at an angle proportionate to the volume of water, by means of the arms 37 provided with rollers 38 running on spindles 39 arranged in the forked part 40.

To permit the admission of the water down stream when it is not desired to operate the device, the base of the rotary grating, turned up stream, is composed of a simple sheet iron cover 41 (Fig. 9) which is joined directly to the upper part of the frame work of the grating 12 suitably arranged for that purpose. During operation it is held in place by the mortising and by the pressure of the water. Displaced to allow direct passage of the water, it is held against the front support 18 after having been slid along shaft 13 prolonged toward the front for that purpose to a suitable extent, the support 18 itself having been placed at the desired distance when mounted.

For convenience, in mounting, the flexible band 9 can, as shown in Fig. 5, be fastened by rivets to the circle 11 of the drum and rest with its other edge against a framework 42 surrounding the circular opening of the barrier.

The base 20 and the wall 25 of the trough can be composed in part of flexible membranes 43 (Fig. 10, 11, 12) fastened by screws 44 and held in normal position by springs 45 themselves fastened by collars 46. Another method of constructing the trough consists of keeping the membrane 43 from its base 20 by means of a counterweight 47, as shown in Fig. 13. The membrane 43 can also be kept from the base 20 of the trough by means of a floater 48, as shown in Fig. 14.

The opening of the gate 5 of the decanting chamber 6 is effected by means of the device shown in Fig. 15. For this purpose the shaft 27 of the propeller bears a crank plate 49 which, by a rod 50, rotates a ratchet wheel 51 intended to raise the gate 5 automatically and intermittently. The ratchet wheel 51 carries a roller 52 which raises a hook 53 fastened to the gate 5.

Having now particularly described and ascertained the nature of my said invention and in what manner the same is to be performed, I declare that what I claim is:—

1. In a rotary apparatus for the removal of refuse and the like from streams, the combination of a channel; a barrier across the channel and having a round opening therein; a rotary shaft mounted to be coaxial with said opening on the up-stream side thereof; a drum-sieve mounted on said shaft and having an open end disposed around said opening; a broad flat metallic band around the lower end of the drum-sieve; a flexible strip yieldably closing the space between the barrier and the lower end of the drum-sieve; covering means for closing the up-stream end of the drum-sieve; and a trough partially immersed in the water of the stream adjacent and parallel to the drum-sieve and provided with a deformable bottom comprising a part mounted on hinges.

2. In a rotary apparatus for the removal of refuse and the like from streams, the combination of a channel; a barrier across the channel and having a round opening therein; a rotary shaft mounted to be co-axial with said opening on the up-stream side thereof; a drum-sieve mounted on said shaft and having an open end disposed around said opening; a broad flat metallic band around the lower end of the drum-sieve; a flexible strip yieldably closing the space between the barrier and the lower end of the drum-sieve; covering means for closing the up-stream end of the drum-sieve; a trough adjacent the drum-sieve and communicating with channel on the up-stream side; a decanting chamber communicating with the trough; a grating establishing communication between the chamber and the downstream side; a discharge gate at the upper part of the chamber; and a plug at the lower part.

3. In a rotary apparatus for the removal of refuse and the like from streams, the combination of a channel; a barrier across the channel and having a round opening therein; a rotary shaft mounted to be co-axial with said opening on the up-stream side thereof; a drum-sieve mounted on said shaft and having an open end disposed around said opening; a broad flat metallic band around the lower end of the drum-sieve; a flexible strip yieldably closing the space between the barrier and the lower end of the drum-sieve; covering means for closing the up-stream end of the drum-sieve; a propeller at the lower end of the drum-sieve; and reducing gears connecting the propeller with said shaft, said propeller being capable of yielding longitudinal movement under pressure of the water while the drum-sieve is being rotated by the propeller.

4. In a rotary apparatus for the removal of refuse and the like from streams, the combination of a channel; a barrier across the channel and having a round opening therein; a rotary shaft mounted to be co-axial with said opening on the up-stream side thereof; a drum-sieve mounted on said shaft and having an open end disposed around said opening; a broad flat metallic band around the lower end of the drum-sieve; a flexible strip yieldably closing the space between the barrier and the lower end of the drum-sieve; covering means for closing the up-stream end of the drum-sieve; a propeller at the lower end of the drum-sieve; and reducing gears connecting the propeller with said shaft, the blades of said propeller being capable of being yieldably deflected while the drum-sieve is being rotated.

5. In a rotary apparatus for the removal of refuse and the like from streams, the combination of a channel; a barrier across the channel and having a round opening therein; a rotary shaft mounted to be co-axial with said opening on the up-stream side thereof; a drum-sieve mounted on said shaft and having an open end disposed around said opening; a broad flat metallic band around the lower end of the drum-sieve; a flexible strip yieldably closing the space between the barrier and the lower end of the drum-sieve; covering means for closing the up-stream end of the drum-sieve; and a trough partially immersed in the water adjacent to the drum-sieve and provided with a movable bottom, and counterweights for yieldably holding the bottom in normal position.

6. In a rotary apparatus for the removal of refuse and the like from streams; the combination of a channel; a barrier across the channel and having a round opening therein; a rotary shaft mounted to be co-axial with said opening on the up-stream side thereof; a drum-sieve mounted on said shaft and having an open end disposed around said opening; a broad flat metallic band around the lower end of the drum-sieve; a flexible strip yieldably closing the space between the barrier and the lower end of the drum-sieve; covering means for closing the up-stream end of the drum-sieve; a crank-plate rotated by the propeller; a ratchet wheel; a pawl carried by the crank plate and engaging the ratchet wheel; a hook carried by the gate; and means carried by the ratchet wheel for engaging the hook and raising the gate.

In testimony whereof I affix my signature in presence of two witnesses.

ERNEST ALPHONSE LAURENT GUIU.

Witnesses:
 POITENY GUISOT,
 EOMASIN PAUL.

---

Copies of this patent may be obtained for five cents each, by addressing the "Commissioner of Patents, Washington, D. C."